May 12, 1936.  F. SACKER  2,040,410

ANTIBUTTING DEVICE

Original Filed Feb. 6, 1935  2 Sheets-Sheet 1

Inventor
Frank Sacker

By Clarence A O'Brien
Attorney

May 12, 1936.                F. SACKER                2,040,410
                          ANTIBUTTING DEVICE
             Original Filed Feb. 6, 1935    2 Sheets—Sheet 2
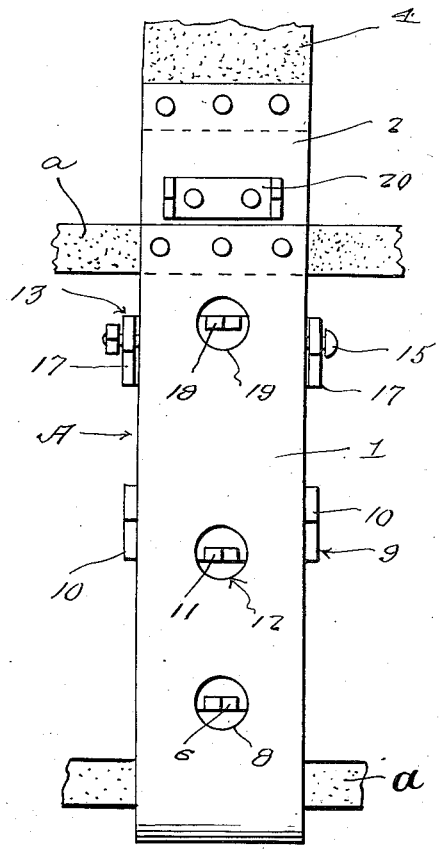
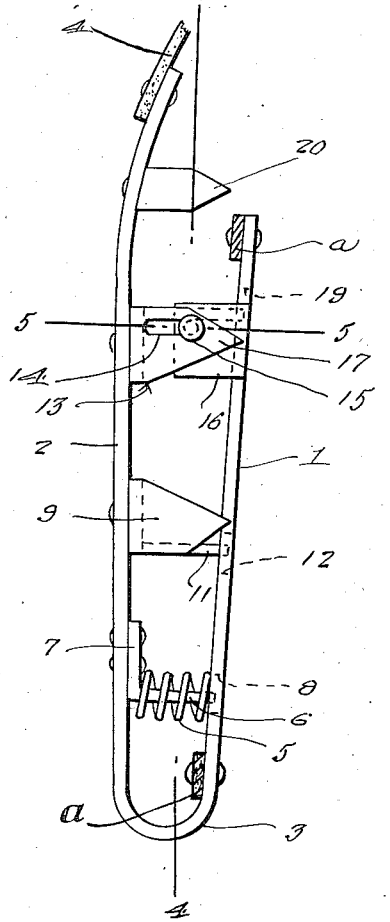
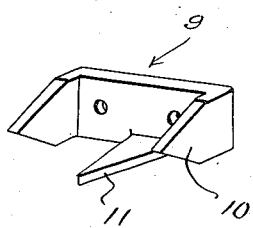
Inventor
Frank Sacker
By Clarence A. O'Brien
                    Attorney Patented May 12, 1936

2,040,410

UNITED STATES PATENT OFFICE 2,040,410

ANTIBUTTING DEVICE

Frank Sacker, Monroe, Wis., assignor of three-fourths to Adam Marty and one-fourth to Harold J. Lamboley, both of Monroe, Wis.

Application February 6, 1935, Serial No. 5,274
Renewed March 30, 1936

4 Claims. (Cl. 119—142)

This invention relates to an antibutting device for use on cattle, such as bulls and the like, the general object of the invention being to provide means for attachment to the head of the animal so that if he should attempt to butt anything, pointed members will prick the animal.

Another object of the invention is to so form the device that there is no danger of the animal tearing the same from its head.

This invention is an improvement over that forming the subject matter of an application filed by me on May 3, 1934, Serial No. 723,773.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 2 is a view looking towards the rear part of the device.

Fig. 3 is a side view of the device.

Fig. 6 is a view of one of the knife assemblies.

Figure 1:
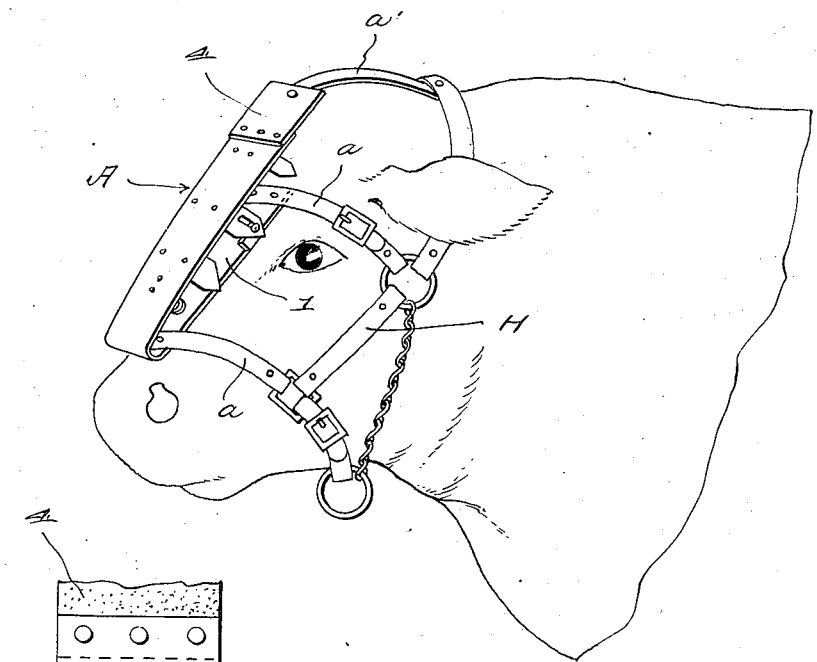
Fig. 1 is a perspective view showing the device on the head of an animal.
Figure 4:
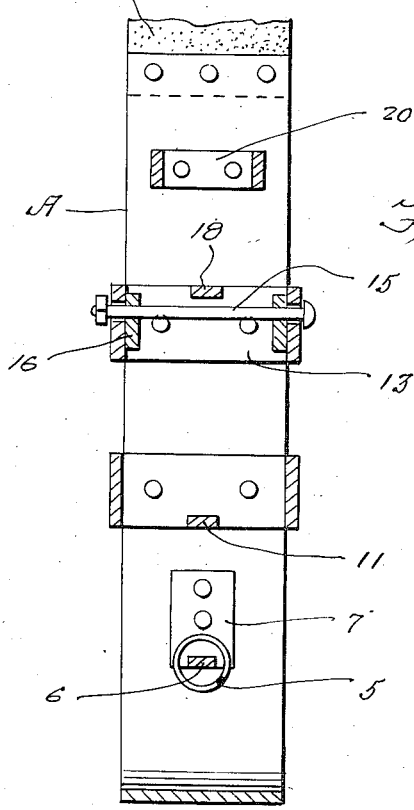
Fig. 4 is a section on line 4—4 of Fig. 3.
Figure 5:
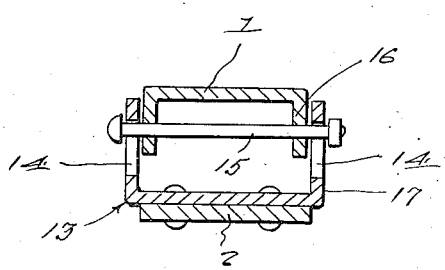
Fig. 5 is a section on line 5—5 of Fig. 3.

In these drawings, the letter A indicates a substantially V-shaped member formed of spring metal and including the rear limb 1, the front limb 2 and a downwardly bowed bight 3. A halter shown generally at H is placed on the animal's head, as shown in Fig. 1, to hold the device in place and this halter includes the upper and lower straps $a$ to which the upper and lower parts of the limb 1 are fastened by rivets or the like. The halter also includes a head strap $a'$ which is fastened to a wide piece of leather or the like shown at 4, the lower end of which is riveted to the upper end of the front limb 2, this limb being longer than the rear limb 1.

The resiliency of the metal from which the device is formed tends to hold the limbs apart and a spring 5 also tends to press the limbs apart, the spring 5 encircling a prong 6 which has its base end bent at right angles and widened and riveted to the lower part of the front limb as shown at 7. This prong is adapted to pass through a hole 8 in the rear limb when the front limb is pressed towards the rear limb. A knife assembly shown in detail at 9 in Fig. 6, is of channel-shape with the ends of its limbs pointed as shown at 10 and a knife or prong 11 is connected to an intermediate part of the bight of the channel member and this prong 11 is adapted to pass through a hole 12 in the limb 1 with the pointed parts 10 adapted to pass the side edges of the limb 1 when the limb 2 is pressed towards the limb 1. A second knife assembly 13 has its bight part attached to the rear face of the limb 2, as is the bight part of the knife assembly 9, the assembly 13 being located above the assembly 9 and the assembly 13 is made similar to the assembly 9 excepting that the limbs of the channel part are provided with the longitudinally extending slots 14 through which a bolt or rod 15 passes, the rod being carried by the forwardly extending projections 16 on the upper portion of the limb 1. The knives or pointed members 17 of the assembly 13 will slide by the projections 16 and the side edges of the limb 1 when the limb 2 is pressed towards the limb 1 and the center knife or prong 18 of the assembly 13 will pass through a hole 19 in the upper part of the limb 1.

The channel-shaped knife assembly 20 has its bight part attached to the rear face of the limb 2 at the upper portion of said limb and this knife assembly 20 is arranged above the upper end of the limb 1. The device is held in position at the front of the head of an animal by the halter as shown in Fig. 1 and as will be seen if the animal attempts to butt an object, the object will exert pressure upon the limb 2 which moves said limb towards the limb 1 and thus the various prongs and knives will prick the animal's head and this will make the animal draw back from the object and as this occurs every time the animal attempts to butt an object, the animal will soon stop attempting to butt objects.

It will also be seen that those knives which pass along the side edges of the limb 1 act as guides and act to hold the two limbs parallel and this prevents the V-shaped member being twisted which might prevent the prongs 11, 6 and 18 from passing through the holes 8, 12 and 19 so that the device would be rendered inoperative and thus the animal might tear the device off its head. With the knives and prongs arranged as shown, the two limbs of the device will remain parallel and are prevented from being twisted so that the knives and prongs will always enter the head of the animal when the limb 2 is pressed towards the limb 1 and thus the animal is stopped from butting and there is no danger of the animal tearing the device from his head. The pin 15 passes through the slots 14 to limit separation and movement of the two limbs.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A device of the class described comprising a substantially V-shaped resilient member, and channel-shaped members connected with the rear face of the front limb and having their limbs pointed at their free ends, said limbs straddling the rear limb.

2. A device of the class described comprising a substantially V-shaped resilient member, and channel-shaped members connected with the rear face of the front limb and having their limbs pointed at their free ends, said limbs straddling the rear limb, the limbs of one channel member having longitudinally extending slots therein and a pin supported by the rear limb and passing through said slots.

3. A device of the class described comprising a substantially V-shaped resilient member, channel-shaped members connected with the rear face of the front limb and having their limbs pointed at their free ends, said limbs straddling the rear limb, the limbs of one channel member having longitudinally extending slots therein and a pin supported by the rear limb and passing through said slots, prongs attached to the front limb and the rear limb having holes therein through which the prongs pass, spring means between the two limbs of the resilient member and acting to press said limbs apart, and means for holding the device on the front portion of the head of an animal.

4. An antibutting device comprising a substantially V-shaped resilient member having its front limb longer than the rear limb and said rear limb having vertically spaced holes therein, a prong connected with the inner face of the front limb and passing through one of the holes when the front limb is pressed towards the rear limb, a spring encircling the prong and tending to press the limbs apart, other prongs carried by the front limb and passing through other holes when the front limb is pressed towards the rear limb, knives carried by the front limbs and passing along the side edges of the rear limb when the front limb is pressed toward the rear limb, a prong carried by the upper part of the front limb and passing above the upper end of the rear limb when the front limb is pressed toward the rear limb, and means for supporting the V-shaped member on the front part of a head of an animal.

FRANK SACKER.